US012044489B2

(12) United States Patent
Bonta

(10) Patent No.: US 12,044,489 B2
(45) Date of Patent: Jul. 23, 2024

(54) FOAMING EVAPORATOR COIL CLEANER

(71) Applicant: Valvoline Licensing and Intellectual Property LLC, Lexington, KY (US)

(72) Inventor: Jacob Bonta, Lexington, KY (US)

(73) Assignee: VGP IPCO LLC, Lexington, KY (US)

( * ) Notice: Subject to any disclaimer, the term of this patent is extended or adjusted under 35 U.S.C. 154(b) by 0 days.

(21) Appl. No.: 17/651,862

(22) Filed: Feb. 21, 2022

(65) Prior Publication Data

US 2022/0268538 A1 Aug. 25, 2022

Related U.S. Application Data

(60) Provisional application No. 63/152,919, filed on Feb. 24, 2021.

(51) Int. Cl.

| | |
|---|---|
| ***C11D 1/72*** | (2006.01) |
| ***C11D 1/14*** | (2006.01) |
| ***C11D 1/22*** | (2006.01) |
| ***C11D 1/722*** | (2006.01) |
| ***C11D 1/75*** | (2006.01) |
| ***C11D 3/04*** | (2006.01) |
| ***C11D 3/20*** | (2006.01) |
| ***C11D 3/30*** | (2006.01) |
| ***C11D 3/43*** | (2006.01) |
| ***F28G 9/00*** | (2006.01) |

(52) U.S. Cl.

CPC .................. *F28G 9/00* (2013.01); *C11D 1/14* (2013.01); *C11D 1/22* (2013.01); *C11D 1/72* (2013.01); *C11D 1/722* (2013.01); *C11D 1/75* (2013.01); *C11D 3/044* (2013.01); *C11D 3/2068* (2013.01); *C11D 3/30* (2013.01)

(58) Field of Classification Search

CPC .. C11D 1/72; C11D 1/722; C11D 1/75; C11D 1/14; C11D 1/22; C11D 3/044; C11D 3/30; C11D 3/2068

USPC ....... 510/191, 238, 421, 422, 424, 435, 499, 510/503, 504

See application file for complete search history.

(56) References Cited

U.S. PATENT DOCUMENTS

2005/0003990 A1 1/2005 Smith et al.
2014/0066350 A1 3/2014 Perlas (Continued)

FOREIGN PATENT DOCUMENTS

CA 2226667 * 1/1997
CN 1302326 A 7/2001

(Continued)

OTHER PUBLICATIONS

English Language Machine Translation of WO2006/072385 (specification). (Year: 2006).*

(Continued)

*Primary Examiner* — Gregory R Delcotto
(74) *Attorney, Agent, or Firm* — BENESCH, FRIEDLANDER, COPLAN & ARONOFF LLP

(57) ABSTRACT

A foaming cleaner includes a composition that includes water about 50 wt. % to about 60 wt. %, a solvent about 20 wt. % to about 50 wt. %, a surfactant about 0.5 wt. % to about 2.5 wt. %, and a pH and corrosion control agent comprising 30% ammonia solution about 1.25 wt. % to about 1.75 wt. %. The composition is configured to form a foam for cleaning an evaporator coil.

6 Claims, 3 Drawing Sheets

(56) References Cited

U.S. PATENT DOCUMENTS

| | | | | |
|---|---|---|---|---|
| 2015/0376556 | A1* | 12/2015 | Ohtani | C11D 3/43 510/386 |
| 2017/0015959 | A1* | 1/2017 | Rodrigues | C11D 17/0043 |
| 2018/0002634 | A1 | 1/2018 | Kleine et al. | |
| 2020/0323199 | A1* | 10/2020 | Wegner | A01N 25/02 |
| 2021/0009925 | A1* | 1/2021 | Emiru | C11D 1/92 |
| 2021/0261893 | A1* | 8/2021 | Van Nuus | B01D 71/80 |
| 2022/0213409 | A1* | 7/2022 | Bakken | C11D 3/33 |

FOREIGN PATENT DOCUMENTS

| | | | | | |
|---|---|---|---|---|---|
| CN | 101563442 | A | | 10/2009 | |
| CN | 103422106 | A | | 12/2013 | |
| CN | 103849881 | A | | 6/2014 | |
| CN | 104893838 | A | | 9/2015 | |
| CN | 106318320 | A | | 1/2017 | |
| CN | 110184131 | A | | 8/2019 | |
| DE | 197 45 538 | C2 | | 2/2003 | |
| EP | 546828 | A1 | * | 6/1993 | C11D 17/0043 |
| EP | 1903097 | A1 | * | 3/2008 | C11D 11/0023 |
| EP | 2138557 | A1 | * | 12/2009 | C10L 10/06 |
| EP | 3118295 | A1 | * | 1/2017 | B08B 1/006 |
| EP | 3118298 | A1 | * | 1/2017 | C11D 1/83 |
| GB | 2205851 | | * | 12/1988 | |
| GB | 2376023 | | * | 12/2002 | |
| JP | 2000 087094 | A | | 3/2000 | |
| JP | 2013-181153 | A | | 9/2013 | |
| WO | WO86/05509 | | * | 9/1986 | C11D 17/0013 |
| WO | WO-9420108 | A1 | * | 9/1994 | A61K 31/425 |
| WO | WO-9428108 | A1 | * | 12/1994 | C11D 1/62 |
| WO | WO-2006033015 | A1 | * | 3/2006 | C11D 17/0013 |
| WO | WO-2006072385 | A1 | * | 7/2006 | C11D 1/75 |
| WO | WO-2009037321 | A1 | * | 3/2009 | H03K 19/0016 |
| WO | WO-2014035633 | A1 | * | 3/2014 | C11D 1/02 |
| WO | WO-2014185927 | A1 | * | 11/2014 | C11D 3/3788 |
| WO | 2017070917 | A1 | | 5/2017 | |

OTHER PUBLICATIONS

International Search Report and Written Opinion dated May 6, 2022 for PCT Application No. PCT/US22/70750, 8 pages.

Office Action issued in Korean Patent Application No. 10-2023-7032704, dated Mar. 13, 2024.

Extended Search Report issued in European Patent Application No. 22760607.6, dated May 6, 2024.

* cited by examiner

FOAMING EVAPORATOR COIL CLEANER

CROSS-REFERENCE TO RELATED APPLICATIONS

This application claims priority from U.S. Provisional application No. 63/152,919, filed on Feb. 24, 2021, which is incorporated by reference herein its entirety.

FIELD OF INVENTION

The present disclosure generally relates to a composition and methods for making and using the composition to clean an evaporator coil.

BACKGROUND

An evaporator coil of a climate control system is cleaned to remove dirt, grime, debris, etc. While cleaning products are available, these products may not clean effectively and quickly enough. In addition, it may be a concern that the cleaning product might damage components in proximity to the evaporator coil or components of the climate control system.

SUMMARY

In one embodiment, a foaming cleaner includes a composition including water about 50 weight percent (wt. %) to about 60 wt. %, a solvent about 20 wt. % to about 50 wt. %, a surfactant about 0.5 wt. % to about 2.5 wt. %, and a pH and corrosion control agent comprising 30% ammonia solution about 1.25 wt. % to about 1.75 wt. %. The composition is configured to form a foam for cleaning an evaporator coil.

In another embodiment, a method of making a foaming cleaner includes mixing a composition under agitation for about 3 minutes to about 5 minutes to form an agitated composition. The composition includes water about 50 wt. % to about 60 wt. %, a solvent about 20 wt. % to about 50 wt. %, a surfactant about 0.5 wt. % to about 2.5 wt. %, and a pH and corrosion control agent comprising 30% ammonia solution about 1.25 wt. % to about 1.75 wt. %. The method includes diluting the agitated composition with water, the volume fraction of the composition to the water is about 1:8 to form a diluted composition. The method also includes mixing the diluted composition for about 3 minutes to about 5 minutes to form a mixed composition.

In another embodiment, a method of cleaning an evaporator coil includes injecting a composition into a drainage of a climate control system of a vehicle and allowing the composition to form a foam that is capable of effective cleaning the evaporator coil and substantially dissipating in less than about 20 minutes or less than about 15 minutes. The composition includes water about 50 wt. % to about 60 wt. %, a solvent about 20 wt. % to about 50 wt. %, a surfactant about 0.5 wt. % to about 2.5 wt. %, and a pH and corrosion control agent comprising 30% ammonia solution about 1.25 wt. % to about 1.75 wt. %.

BRIEF DESCRIPTION OF THE DRAWINGS

In the accompanying figures, chemical formulas, chemical structures, and experimental data are given that, together with the detailed description provided below, describe example embodiments.

DETAILED DESCRIPTION

Figure 1:
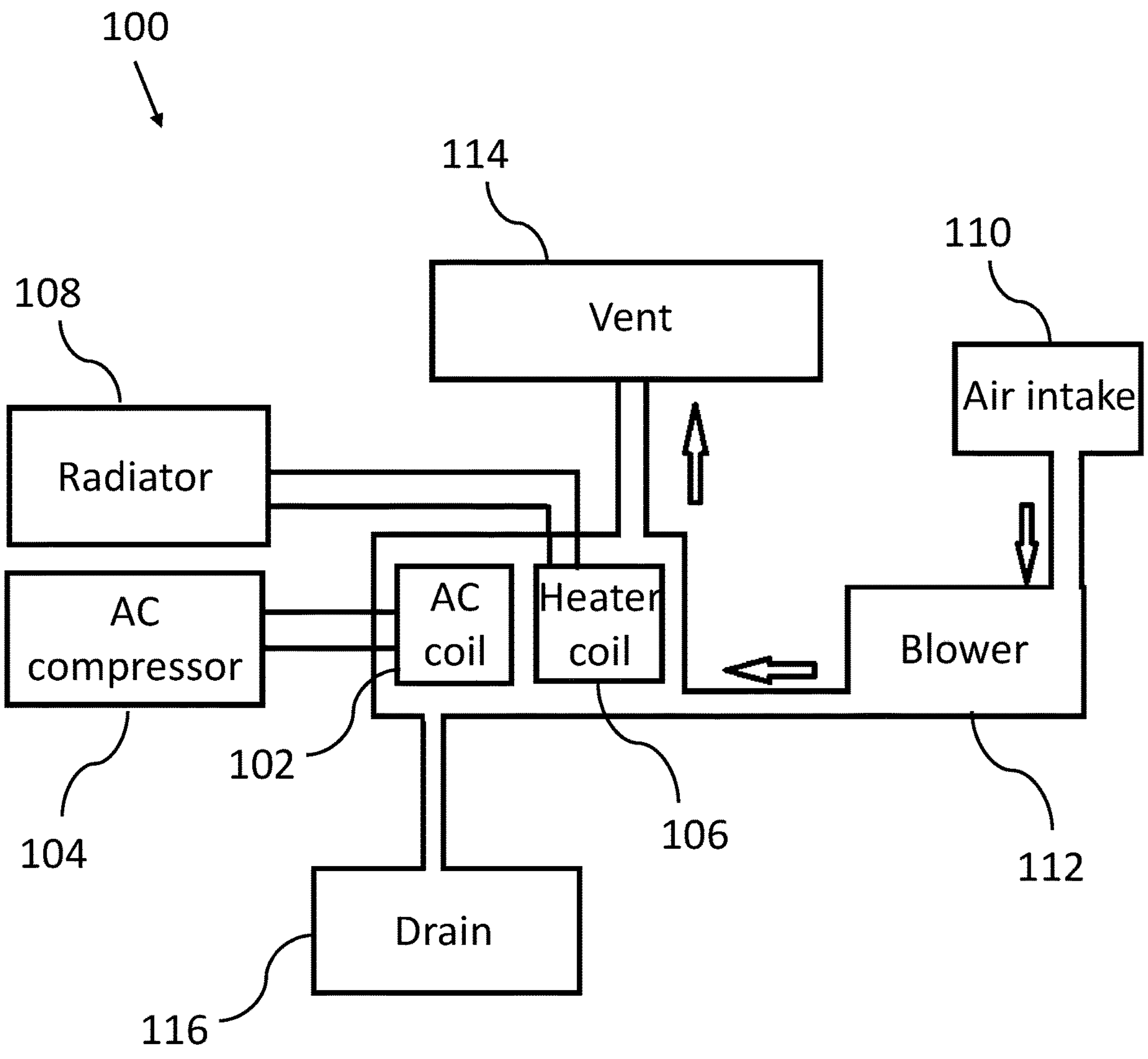
FIG. 1 is a block diagram of an exemplary climate control system.

The foaming cleaner described herein may be used to clean an evaporator of a climate control system of a vehicle or any system having a coil or an evaporator coil, such as a heating, ventilation, and air conditioning (HVAC) system. FIG. 1 shows a block diagram of an exemplary climate control system 100 that may be benefited from the foaming cleaner described herein. The climate control system 100 includes an air conditioning (AC) evaporator coil 102 coupled to an AC compressor 104 and a heat coil 106 coupled to a radiator 108. The climate control system 100 further includes an air intake 110, a blower 112, a vent 114, and a drain 116. The ambient air enters the climate control system 100 from the air intake 110 and is circulated by the blower 112 through the AC evaporator coil 102 and/or the heater coil 106 to achieve desired conditioning. The conditioned air is vented through the vent 114. The condensed moisture and water exits the climate control system 100 at the drain 116. The climate control system 100 may be a vehicle AC system, the conditioned air is vented from the vent 114 into the cabin of the vehicle, and the moisture and water are drained to the exterior beneath the vehicle.

The foaming cleaner discussed herein is designed to have several advantages. To list a few, the foam can be applied with any appropriate tools, for example, a can or an aerosol can. The foam is applied to a coil (e.g., an evaporator coil and/or a heater coil) for a certain period of time (e.g., 20 minutes or less, 15 minutes or less) and then it breaks and drains out from the same entry point (e.g., a drainage of a climate control system). For example, the foam may be injected into the drain 116 to fill the chamber containing the AC evaporator coil 102. Depending on the size and configuration of the chamber, the foam may encompass and clean the heater coil 106. The AC evaporator coil 102 condenses moisture from the atmosphere during the operation of the climate control system 100 and thus there are various contamination formations (e.g., dust, mold, mildew, debris, etc.) on the AC evaporator coil 102. The foam is configured to encompass and solvate the soils on the coil (e.g., the AC evaporator coil 102 and/or the heater coil 106) and to remove the various contamination formations from the coil. The foam then breaks and drains out from the drain 116.

The foam aids in removal of odors from the climate control system and improves the efficacy of the coil (e.g., an evaporator coil and/or a heater coil). The foam is more advantageous than a liquid in that the foam is less likely to interfere with electrical systems or leaking onto upholstery. The foam contacts an entire or nearly entire interior surface of the coil and dissipates in a reasonable amount of time. For example, the foam substantially dissipates under 1 hour, under 45 minutes, under 30 minutes, under 20 minutes, or under 15 minutes (e.g., 0.1 minute to 14.9 minute). As such, the foam permits evaporator coil cleaning with a reasonable timed treatment and the foam dissipates in sufficient time to not leave foam/residue in the system when cleaning is completed. The foam may be applied to any system having an evaporator coil that may become dirty, e.g. HVAC systems. The foam is formulated and/or processed to have the designed foam profile (e.g., density, break time, volume, persistence), the characteristics of foam duration, volume and breakdown to permit the foam to completely or substantially completely coat an evaporator coil and remain in place for a sufficient amount of time to clean the evaporator coil, and then completely or substantially dissipates.

Table 1 summarizes an exemplary composition for forming a foam for cleaning a coil.

TABLE 1

| Component | Concentration Range (wt. %) |
|---|---|
| DI Water | 50-60 |
| Solvent | 20-50 |
| Surfactant | 0.5-2.5 |
| pH and corrosion control agent | 1.25-1.75 |
| Fragrance | 0.25 |

A suitable solvent for the composition for forming the foam is a solvent that dissolves in water (e.g., satisfies the solubility needed in water). The solvent may be propylene/ethylene glycol ethers or acetates. Examples of the solvent may include dipropylene glycol methyl ether, tripropylene glycol methyl ether, propylene glycol n-propyl ether, dipropylene glycol n-propyl ether, diethylene glycol ethyl ether, diethylene glycol methyl ether, diethylene glycol n-butyl ether, ethylene glycol propyl ether, ethylene glycol n-butyl ether, triethylene glycol methyl ether, triethylene glycol ethyl ether, triethylene glycol n-butyl ether, methyl acetate, diethylene glycol monoethyl acetate, ethylene glycol monobutyl ether acetate, propylene glycol monomethyl ether (glycol ether PM), diethylene glycol monoethyl ether, or a combination thereof. The performance of the solvent may be better when the molecular weight of the solvent is lower and the vapor pressure is higher.

A suitable surfactant for the composition for forming the foam may help producing the desired foam profile (e.g., density, break time, volume, persistence) and providing good substrate wetting while maintaining the cleaning efficiency. The surfactant may include decyl alcohol ethoxylates with POE 4-9. Surfactants with higher POE may cause too much foam formation and POE lower than 4 may result in insufficient foam formation. Examples of the surfactant may include alcohol ethoxylates with POE 1-9, non-ionic surfactants, sodium/ammonium laureth sulfates with 1-3 moles EO, sodium/ammonium lauryl sulfates, cocamide dea/mea, lauramine oxides, sodium/ammonium olefin sulfonates, isodecyl alcohol ethoxylate (MAKON® DA-6, available from Stepan Company headquartered in Northfield, Illinois, US), or a combination thereof.

A suitable pH and corrosion control agent for the composition for forming the foam is used to adjust the pH level of the foam to a suitable and safe level for typical materials used in construction of an AC evaporator system. For example, a suitable pH/corrosion control agent helps adjusting the pH of the foam such that the foam can safely contact AC system components made of aluminum, steel, and/or various plastics, without corroding these components. In one embodiment, the suitable pH and corrosion control agent is configured to adjust the pH level of the foam to pH=8 to 10. A suitable pH and corrosion control agent may also be configured to protect the container (e.g., steel canister) containing the foam from corrosion. Examples of the pH and corrosion control agent include 30% ammonium hydroxide solution, 50% sodium/potassium/calcium hydroxide solution (e.g., sodium, potassium, and/or calcium hydroxide solution), acetic acid/sodium acetate, or a combination thereof.

The composition for forming the foam is formulated to have one or more of the advantages discussed above. The composition may include volatile organic compound (VOC). Table 2 summarizes an exemplary VOC-containing composition for forming a foam for cleaning a coil.

TABLE 2

| Component | Concentration Range (wt. %) |
|---|---|
| DI Water | 50-60 |
| Glycol ether PM | 35-45 |
| Stepan MAKON ® DA-6 | 1.25-1.75 |
| 30% Ammonia solution | 1.25-1.75 |
| Fragrance | 0.25 |

The VOC-containing composition includes distilled water about 50 wt. % to about 60 wt. %, propylene glycol monomethyl ether (Glycol ether PM) about 35 wt. % to about 45 wt. %, Stepan MAKON® DA-6 about 1.25 wt. % to about 1.75 wt. %, 30% ammonia solution about 1.25 wt. % to about 1.75 wt. %, and fragrance about 0.25 wt. %.

The composition may be substantially free of VOC or may include very low amount of VOC, for example, the composition may include about 0.1 wt. % to about 4 wt. % of VOC. Table 2 summarizes an exemplary VOC-free composition for forming a foam for cleaning a coil.

TABLE 3

| Component | Concentration Range (wt. %) |
|---|---|
| DI Water | 50-60 |
| Diethylene glycol monoethyl ether | 35-45 |
| Stepan MAKON ® DA-6 | 1.25-1.75 |
| 30% Ammonia solution | 1.25-1.75 |
| Fragrance | 0.25 |

The VOC-free composition includes distilled water about 50 wt. % to about 60 wt. %, diethylene glycol monoethyl ether about 35 wt. % to about 45 wt. %, Stepan MAKON® DA-6 about 1.25 wt. % to about 1.75 wt. %, 30% ammonia solution about 1.25 wt. % to about 1.75 wt. %, and fragrance about 0.25 wt. %. In some embodiments, the fragrance in compositions shown in Tables 1-3 may be omitted.

Figure 2:
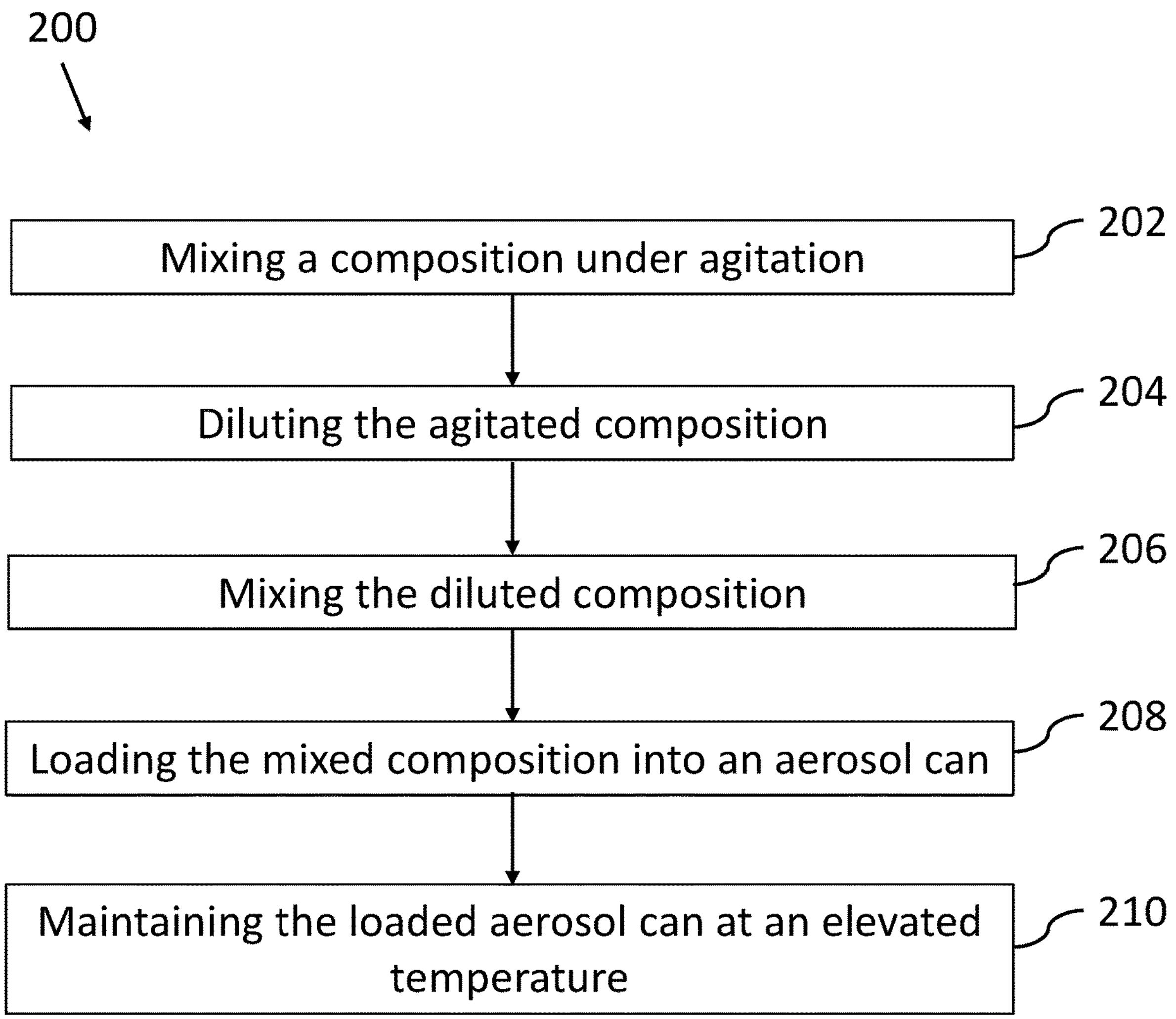
FIG. 2 is an exemplary process for making a foaming cleaner.

FIG. 2 is an exemplary process 200 for making a foaming cleaner based on the compositions discussed above. The process 200 includes mixing a composition under agitation (step 202). In step 202, the components of the composition (e.g., compositions shown in Table 1, Table 2, or Table 3) are added to an appropriate mixing vessel by weight, in any order. The components are mixed under gentle agitation for about 3-5 minutes to form an agitated composition. The process 200 includes diluting the agitated composition (step 204). In step 204, the agitated composition is then diluted 1:8 with distilled water (DI water) to form a diluted composition. The process 200 includes mixing the diluted composition to form a mixed composition (step 206). In step 206, the diluted composition is mixed for about 3-5 minutes to ensure full incorporation.

The process 200 includes loading the mixed composition into an aerosol can (step 208). In step 208, the mixed composition is loaded into an appropriate container, such as an aerosol can. The loading pressure and the amounts of propellant(s) are adjusted depending on at least the amount of the mixed composition and the volume of the aerosol can to ensure desired foam characteristics. For example, for loading about 220 gram (g) of the mixed composition, the spray valve is crimped in place and charged to approximately 70-100 pounds per square inch (psi) with propane/butane propellant. The process 200 may include maintaining the loaded aerosol can (from step 208) at an elevated temperature (step 210). In step 210, the loaded aerosol may be heated up and maintain at an appropriate temperature for an appropriate length of time to ensure that the propellant completely or substantially blends with the composition. For example, the aerosol can is maintained in a warm water bath (e.g., temperature between 60 degree Celsius (° C.) and 70° C.) for about 10 to 20 minutes. In some embodiments, step 210 may be omitted.

TESTING

The composition and processing of the foaming cleaner are designed to create beneficial foaming properties for cleaning an evaporator coil effectively in a short time. The surfactant, solvent, and concentration ranges of each component of the composition are specifically designed to produce a thick, cavity filling foam that is able to swell to wet the entire or nearly entire surface of the evaporator coil, and also able to dissipate and drain quickly to allow for a short service window of less than about 20 minutes, about 15 minutes, or less than about 15 minutes. The properties of the foaming cleaner may be tested in ways discussed below.

A. Foam Evaluation Test

A transparent cylinder with graduations to measure volume is modified to have a drain in the bottom of approximately 0.25 inches in diameter. A clear, plexiglass sheet is cut to a size to cover the top of the cylinder. Approximately 220 g of product (e.g., the mixed composition produced in step 208) is placed in an aerosol can and then charged to 70-100 psi with propane/butane propellant. The charged can is stored in a warm water bath for 4 hours to ensure the propellant completely blends with the product.

The can is fitted with the application hose which is fed into the drain of the cylinder. The drain size is appropriate for forming a snug fit that prevents leaking during application. The can is then completely discharged into the cylinder. Once completely discharged the total volume and character of the foam produced is recorded.

The volume of foam lost is recorded at selected time intervals over a total of 15 minutes. Good compositions are expected to form a thick, large volume of foam that breaks to less than 25% of its initial volume in 15 minutes. Poor compositions either produce foam that is too persistence and does not break in a timely manner, or does not produce a desired volume of foam.

B. Cleaning Efficiency Evaluation

The cleaning efficiency is evaluation after application of the foaming cleaner to a vehicle. The effluent of the wash is collected and inspected visually for contaminants. A relative scale is established to show efficiency.

C. Foam Profile

The performance of the foam disclosed herein is dependent on the foam properties or foam profile. The foam is delivered to the entire surface or nearly entire surface of the evaporator coil by transport of the foam through the drain tube. The foam is configured to contact and wet the surface of the coil and maintain its structure long enough to provide good cleaning action and break quickly enough so as not to persist in the system and prevent usage of the vehicle for an extended period. The desirable foam profile is discussed below in terms of foam density, foam volume, and foam persistence.

The density of the foam is dictated by the average size of the bubbles that comprise the foam. The density is measured by weight after discharging a fixed volume of foam. A higher density foam may be more desirable as it delivers the larger ratio of cleaner per unit volume to the evaporator coil resulting in better cleaning efficiency.

The volume of the foam (e.g., volume of the product per can) is fixed. The formulations disclosed herein (e.g., compositions in Tables 1-3) are designed such that the volume of the foam produced is adequate to perform the service but not so large as to overflow and damage components outside the evaporator coil box. Based on examinations of many vehicle evaporator boxes and components, the compositions and the foam disclosed herein are designed to provide adequate cleaning action for coils having an average free volume (e.g., free space between the coil and the coil box containing the coil) of about 2.5 liters (L).

A critical factor in performance is the duration the foam persists in the evaporator coil box. The formulations disclosed herein (e.g., the compositions disclosed herein in Tables 1-3) are designed and tuned specifically such that the foam can expand and cover all components fully or substantially but break and flow back out of the system. The foam cleaner is designed for quick-lube or mechanic service and thus is usable in a 15 to 20 minute service window. Failure to break in this time interval may cause contamination of the vehicle cabin and other components once the vehicle is back into usage. Most standard surfactants (e.g., SLS, ethoxylated alcohols, cocamide and derivatives, etc.) may produce large foams but they are very persistent and will retain the large portion of their volume for periods of 30 minutes or longer. Most standard surfactants are also not very dense or lacey and provide poor cleaning action. Most typical low foam surfactants (e.g., block EO/PO copolymers, etc.) do not produce adequate foam to fill and clean the evaporator coil and box.

Figure 3:
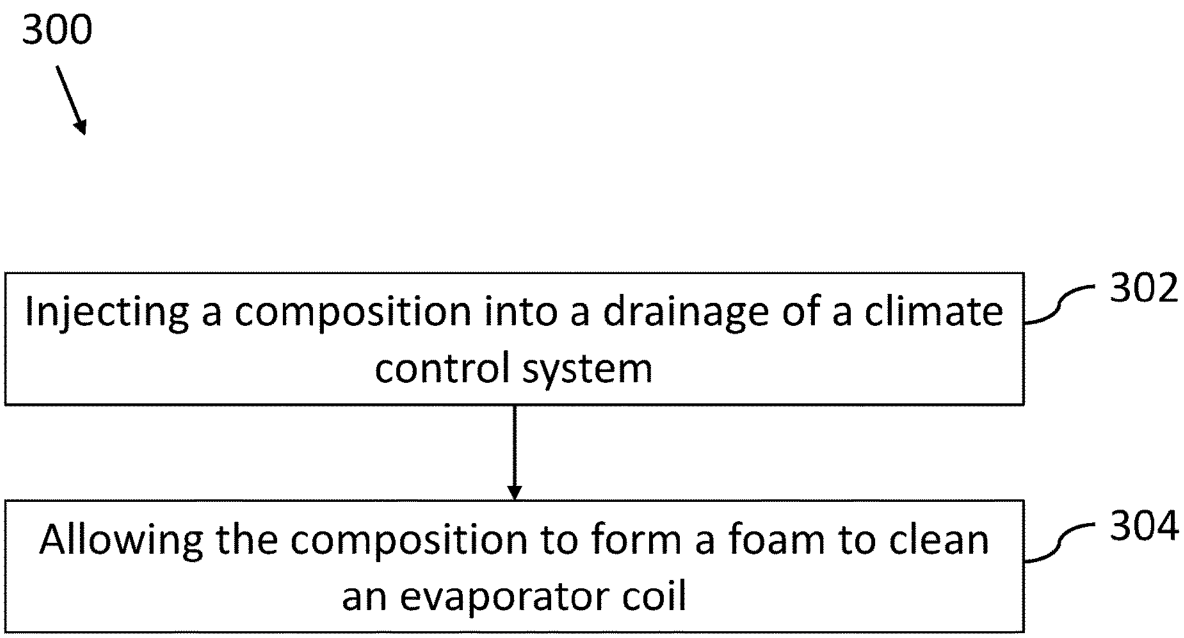
FIG. 3 is an exemplary method of cleaning an evaporator coil.

FIG. 3 is an exemplary method 300 of cleaning an evaporator coil using the foaming cleaner disclosed herein. The method 300 includes injecting a composition into a drainage of a climate control system (step 302). In step 302, the composition produced in step 208 or 210 is injected from the aerosol can into a drainage of a climate control system (of a vehicle) to form a foam. In some embodiments, the method 300 may include maintaining the loaded aerosol can at an elevated temperature before using the aerosol can (prior to step 302). Prior to usage, the aerosol can may be heated up and maintain at an appropriate temperature for an appropriate length of time to ensure that the propellant completely or substantially blends with the composition. For example, the aerosol can is maintained in a warm water bath (e.g., temperature between 60 degree Celsius (° C.) and 70° C.) for about 10 to 20 minutes before spraying the foaming composition into a drainage of a climate control system.

The method 300 includes allowing the composition to form a foam to clean an evaporator coil (step 304). The composition sprayed or ejected out of the aerosol can is designed to form a foam that completely or substantially completely cover the surface of the evaporator coil for a certain period of time and drain out form the same entry point (e.g., the drainage of the climate control system). The foam is designed to clean the coil surface while it is in contact with the surface. As the foam dissipates or breaks down, it drains out from the same entry point (e.g., the drainage of the climate control system), leaving substantially free of foam residue. As such, there is no need to wipe or clean the evaporator coil after application of the foaming cleaner disclosed herein. In some embodiments, the foam is designed to completely or substantially completely cover the surface of the evaporator coil for about 15 minutes.

To the extent that the term "includes" or "including" is used in the specification or the claims, it is intended to be inclusive in a manner similar to the term "comprising" as that term is interpreted when employed as a transitional word in a claim. As used in the specification and the claims, the singular forms "a," "an," and "the" include the plural. Furthermore, to the extent that the term "or" is employed (e.g., A or B), it is intended to mean "A or B or both." Finally, where the term "about" or "approximately" is used in conjunction with a number, it is intended to include within ±5%, within ±4%, within ±3%, within ±2%, within ±1%, or within ±0.5% of the number.

As stated above, while the present application has been illustrated by the description of embodiments, and while the embodiments have been described in considerable detail, it is not the intention to restrict or in any way limit the scope of the appended claims to such detail. Additional advantages and modifications will readily appear to those skilled in the art, having the benefit of this application. Therefore, the application, in its broader aspects, is not limited to the specific details and illustrative examples shown. Departures may be made from such details and examples without departing from the spirit or scope of the general inventive concept.

The invention claimed is:

1. A foaming cleaner for cleaning an evaporator coil consisting of:

from about 50 wt. % to about 60 wt. % of water;

from about 35 wt. % to about 45 wt. % of diethylene glycol monoethyl ether or propylene glycol monomethyl ether;

from about 1.25 wt. % to about 1.75 wt. % of isodecyl alcohol ethoxylate;

from about 1.25 wt. % to about 1.75 wt. % of 30% ammonia solution, which is a pH and corrosion control agent, and optionally, about 0.25 wt. % of a fragrance, wherein the composition is configured to form a foam and cover a surface of the evaporator coil for about 15 minutes.

2. The foaming cleaner of claim 1, wherein the pH and corrosion control agent is configured achieve a pH between 8 and 10 for the foam.

3. The foaming cleaner of claim 1, wherein the foam is configured to substantially dissipate in less than about 20 minutes.

4. A foaming cleaner in the form of a pressurized aerosol for cleaning an evaporator coil consisting of:

from about 50 weight percent (wt. %) to about 60 wt. % of water;

from about 35 wt. % to about 45 wt. % of diethylene glycol monoethyl ether or propylene glycol monomethyl ether;

from about 1.25 wt. % to about 1.75 wt. % of isodecyl alcohol ethoxylate;

from about 1.25 wt. % to about 1.75 wt. % of 30% ammonia solution, which is a pH and corrosion control agent, and optionally, about 0.25 wt. % of a fragrance, wherein the pressurized aerosol upon spraying is configured to form a foam and cover a surface of the evaporator coil for about 15 minutes.

5. The foaming cleaner of claim 4, wherein the pressurized aerosol is pressurized to 70 to 100 pounds per square inch (psi).

6. The foaming cleaner of claim 4, wherein the propellant is propane and/or butane.

* * * * *